United States Patent
Ono et al.

(10) Patent No.: US 11,796,050 B2
(45) Date of Patent: Oct. 24, 2023

(54) SHIFT DEVICE WITH SHIFT BODY THAT CAN BE INHIBITED FROM DISPLACEMENT

(71) Applicants: KABUSHIKI KAISHA TOKAI-RIKA-DENKI-SEISAKUSHO, Aichi-ken (JP); TOYOTA JIDOSHA KABUSHIKI KAISHA, Aichi-ken (JP)

(72) Inventors: Hiroki Ono, Aichi-ken (JP); Nobuhisa Inoue, Aichi-ken (JP)

(73) Assignees: KABUSHIKI KAISHA TOKAI-RIKA-DENKI-SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/222,615

(22) Filed: Apr. 5, 2021

(65) Prior Publication Data
US 2021/0317909 A1    Oct. 14, 2021

(30) Foreign Application Priority Data
Apr. 13, 2020 (JP) .................................. 2020-071903

(51) Int. Cl.
*F16H 59/08*    (2006.01)

(52) U.S. Cl.
CPC ....... *F16H 59/08* (2013.01); *F16H 2059/081* (2013.01)

(58) Field of Classification Search
CPC .... F16H 59/08; F16H 59/12; F16H 2059/081; G05G 1/10; G05G 1/082; G05G 1/08; G05G 1/087
USPC ........................................................ 74/473.3
See application file for complete search history.

(56) References Cited

U.S. PATENT DOCUMENTS

| | | | |
|---|---|---|---|
| 6,410,866 B1 * | 6/2002 | Klein | B60K 37/06 200/5 B |
| 7,227,447 B2 * | 6/2007 | Ohtaki | B60R 25/045 340/5.62 |
| 8,664,551 B2 * | 3/2014 | Nakajima | H01H 19/11 200/18 |
| 8,680,418 B2 * | 3/2014 | Nakajima | H01H 19/11 200/565 |
| 9,477,329 B1 * | 10/2016 | Ding | G06F 3/0362 |
| 2004/0154910 A1 | 8/2004 | Hayashi | |
| 2006/0100059 A1 * | 5/2006 | Nonaka | G05G 5/06 477/121 |
| 2007/0261509 A1 | 11/2007 | Meyer et al. | |
| 2012/0260764 A1 | 10/2012 | Takehara et al. | |
| 2013/0047768 A1 | 2/2013 | Kamoshida et al. | |

(Continued)

FOREIGN PATENT DOCUMENTS

| | | | |
|---|---|---|---|
| DE | 19610148 A1 * | 9/1997 | ......... B60H 1/00985 |
| DE | 19936257 A1 * | 2/2001 | ........... G06F 3/0482 |

(Continued)

*Primary Examiner* — T. Scott Fix
(74) *Attorney, Agent, or Firm* — Thomas W. Cole; Calderon Safran & Cole P.C.

(57) ABSTRACT

In a shift device, a shift position of a knob is altered as a result of the knob being displaced in a vertical direction, and also being rotated in one direction or in another direction. Here, the knob is disposed on an outer side in a radial direction of a supporting column. Because of this, the knob can be inhibited by the supporting column from being unnecessarily displaced downwards.

13 Claims, 2 Drawing Sheets

(56) References Cited

U.S. PATENT DOCUMENTS

| | | | |
|---|---|---|---|
| 2015/0369358 A1 | 12/2015 | Lee et al. | |
| 2018/0079302 A1* | 3/2018 | Tsai | ................ B60K 20/00 |
| 2018/0172145 A1* | 6/2018 | Farges | ................ B60R 25/045 |
| 2018/0259063 A1 | 9/2018 | Wang et al. | |
| 2018/0274664 A1* | 9/2018 | Corkins | ................ G05G 5/005 |

FOREIGN PATENT DOCUMENTS

| | | | | |
|---|---|---|---|---|
| DE | 102007029594 A1 | * | 1/2009 | ............ F16H 59/12 |
| DE | 102009001936 A1 | * | 9/2010 | ............ G05G 1/087 |
| EP | 1229272 A2 | * | 8/2002 | ............ G05G 1/10 |
| FR | 3056473 A1 | * | 3/2018 | ............ B60K 35/00 |
| GB | 2109535 A | * | 6/1983 | ............ G05G 1/087 |
| GB | 2157800 A | * | 10/1985 | ......... H01H 43/106 |
| GB | 2444502 A | * | 6/2008 | ............ G05G 5/005 |
| JP | 2000315431 A | * | 11/2000 | ............ G05G 1/087 |
| JP | 2004-241317 A | | 8/2004 | |
| JP | 2005-347234 A | | 12/2005 | |
| JP | 2008-518845 A | | 5/2006 | |
| JP | 2008-047370 A | | 2/2008 | |
| JP | 2011-042354 A | | 3/2011 | |
| JP | 2012-086828 A | | 5/2012 | |
| JP | 2013-047074 A | | 3/2013 | |
| JP | 2016-510282 A | | 4/2016 | |
| JP | 2020-509971 A | | 4/2020 | |

\* cited by examiner

SHIFT DEVICE WITH SHIFT BODY THAT CAN BE INHIBITED FROM DISPLACEMENT

CROSS-REFERENCE TO RELATED APPLICATION

This application is based on and claims priority under 35 USC 119 from Japanese Patent Application No. 2020-71903 filed on Apr. 13, 2020, the disclosure of which is incorporated by reference herein.

BACKGROUND

Technical Field

The present disclosure relates to a shift device in which a shift position is altered as a result of a shift body being rotated and displaced.

Related Art

In an operating device described in Japanese Unexamined Patent Application Laid-Open (JP-A) No. 2008-518845, a shift position is altered as a result of a rotating switch being rotated in a circumferential direction, and also being displaced in an axial direction.

Here, in this type of operating device, it is preferable that it be possible to inhibit the rotating switch from being displaced unnecessarily.

SUMMARY

The present disclosure was conceived in view of the above-described circumstances, and it is an object thereof to provide a shift device that makes it possible to inhibit a shift body from being displaced unnecessarily.

A shift device of a first aspect of the present disclosure is provided with a protruding portion that protrudes towards a vehicle cabin side; and a shift body disposed at an outer side in a radial direction of the protruding portion, and having a shift position that is altered as a result of the shift body being rotated towards a circumferential direction side of the protruding portion and also being displaced towards an axial direction side of the protruding portion.

In the shift device of the first aspect of the present disclosure, the protruding portion protrudes towards the vehicle cabin side, and the shift position of the shift body is altered as a result of the shift body being rotated towards the circumferential direction side of the protruding portion and also being displaced towards the axial direction side of the protruding portion.

Here, the shift body is disposed at the outer side in the radial direction of the protruding portion. Because of this, the shift body can be inhibited by the protruding portion from being unnecessarily displaced.

A shift device of a second aspect of the present disclosure is characterized in that, in the shift device of the first aspect of the present disclosure, wherein a surface at a protruding portion distal end side of the shift body is disposed either at a same position in the axial direction of the protruding portion as a distal end surface of the protruding portion, or at a protruding portion base end side relative to the distal end surface of the protruding portion.

In the shift device of the second aspect of the present disclosure, the surface at the protruding portion distal end side of the shift body is disposed either at the same position in the axial direction of the protruding portion as the distal end surface of the protruding portion, or at the protruding portion base end side relative to the distal end surface of the protruding portion. Because of this, the shift body can be inhibited from being unnecessarily displaced to the protruding portion base end side.

A shift device of a third aspect of the present disclosure is characterized in that, in the shift device of the first aspect or second aspect of the present disclosure, an angled surface of the shift body between a protruding portion distal end side and the outer side in the radial direction of the protruding portion is inclined so as to slope towards a protruding portion base end side as the angled surface approaches the outer side in the radial direction of the protruding portion.

In the shift device of the third aspect of the present disclosure, the angled surface of the shift body between the protruding portion distal end side and the outer side in the radial direction of the protruding portion is inclined so as to slope towards the protruding portion base end side as the angled surface approaches the outer side in the radial direction of the protruding portion. Because of this, the shift body can be inhibited from being unnecessarily displaced to the protruding portion base end side.

A shift device of a fourth aspect of the present disclosure is characterized in that, in the shift device of any one of the first aspect through the third aspect of the present disclosure, a vehicle rearward side or lower side portion of a surface at a protruding portion distal end side of the shift body is disposed at a protruding portion base end side.

In the shift device of the fourth aspect of the present disclosure, the vehicle rearward side or lower side portion of the surface at the protruding portion distal end side of the shift body is disposed at the protruding portion base end side. Because of this, when, for example, a palm of a person's hand is placed on the distal end side of the protruding portion, it is possible to inhibit the vehicle rearward side or lower side portion of the surface at the protruding portion distal end side of the shift body from being pressed by the most fleshy portion of the palm of the hand, so that the shift body can be inhibited from being displaced to the protruding portion base end side.

A shift device of a fifth aspect of the present disclosure is characterized in that, in the shift device of any one of the first aspect through the fourth aspect of the present disclosure, there is further provided an exposed surface that is exposed towards the vehicle cabin side, wherein a surface at a protruding portion base end side of the shift body is disposed either at a same position in the axial direction of the protruding portion as the exposed surface, or at the protruding portion base end side relative to the exposed surface.

In the shift device of the fifth aspect of the present disclosure, the exposed surface is exposed towards the vehicle cabin side, and the surface at the protruding portion base end side of the shift body is disposed either at the same position in the axial direction of the protruding portion as the exposed surface, or at the protruding portion base end side relative to the exposed surface. Because of this, it is possible to inhibit foreign matter from penetrating between the shift body and the exposed surface.

A shift device of a sixth aspect of the present disclosure is characterized in that, in the shift device of any one of the first aspect through the fifth aspect of the present disclosure, the shift body is configured to be rotatable after having been displaced.

In the shift device of the sixth aspect of the present disclosure, the shift body is configured to be rotatable after the shift body has been displaced. Because of this, it is possible to restrict a rotation of the shift body before it has been displaced, so that an erroneous operation of the shift body is inhibited.

BRIEF DESCRIPTION OF THE DRAWINGS

Exemplary embodiments of the present disclosure will be described in detail based on the following figures, wherein.

DETAILED DESCRIPTION

Figure 1:
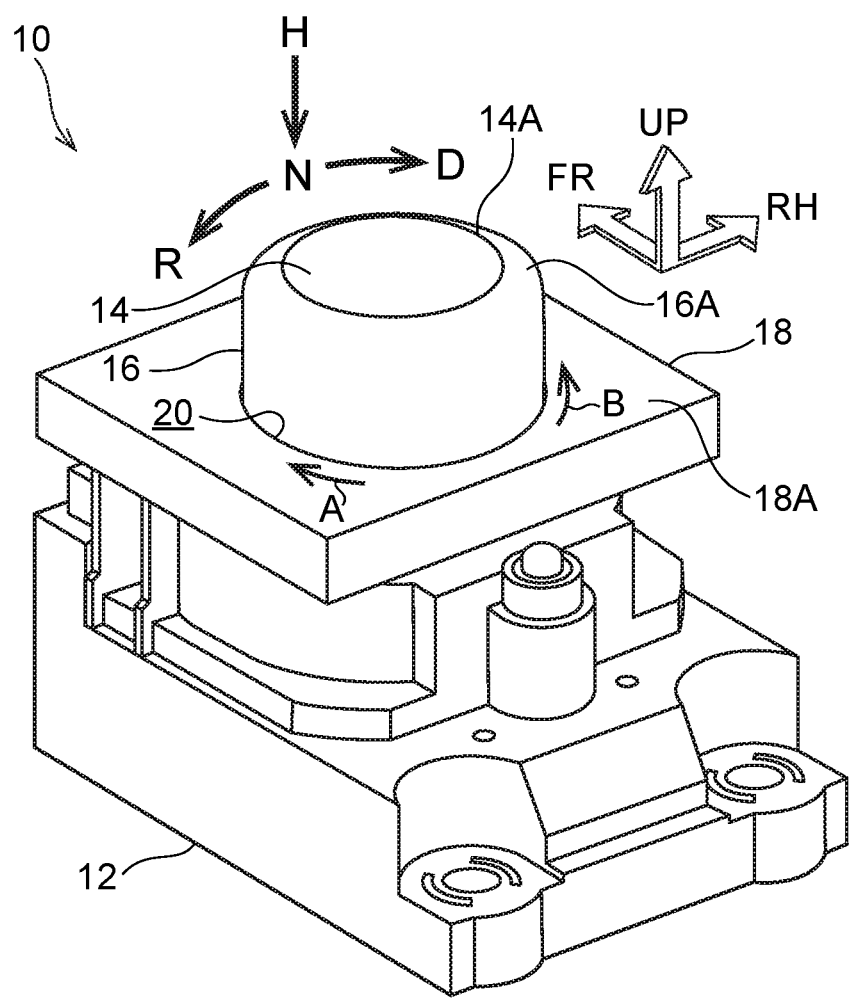
FIG. 1 is a perspective view as seen from a left-side diagonally rearward direction showing a shift device according to an exemplary embodiment of the present disclosure.

A shift device 10 according to an exemplary embodiment of the present disclosure is shown in FIG. 1 in a perspective view as seen from a left-side diagonally rearward direction. Note that an arrow FR, an arrow RH, and an arrow UP that are shown in the appropriate drawings respectively indicate a front side of the shift device 10, a right side of the shift device 10, and an upper side of the shift device 10.

The shift device 10 according to the present exemplary embodiment is installed in a console (not shown in the drawings) of a vehicle (i.e., an automobile), and is disposed on a vehicle front-side and inner side in a vehicle width direction of a driver's seat (not shown in the drawings) of the vehicle. The front side, left side, and upper side of the shift device 10 face respectively towards the front side, left side, and upper side of the vehicle.

As is shown in FIG. 1, a substantially rectangular parallelepiped-box shaped plate 12, which serves as a supporting body, is provided in the shift device 10. An interior of the plate 12 is open on the lower side thereof, and is fixed inside the console. A substantially circular-column shaped supporting column 14 (see FIG. 2), which serves as a protruding portion, is provided integrally with an upper wall of the plate 12. The supporting column 14 protrudes upwards so as to extend above the upper side of the console. A circular-plate shaped panel 14A is provided integrally with an upper end (i.e., a distal end) of the supporting column 14 so as to be coaxial therewith, and a diameter of the panel 14A is formed larger than a diameter of portions of the supporting column 14 other than the panel 14A.

A circular-cylinder shaped knob 16, which serves as a shift body, is supported on the supporting column 14 so as to be coaxial therewith. An inner diameter of the knob 16 is formed substantially the same as the diameter of portions of the supporting column 14 other than the panel 14A, and an outer diameter of the knob 16 is formed larger than the diameter of the panel 14A. Portions of the supporting column 14 other than the panel 14A are fitted inside the knob 16 so as to be coaxial therewith. An upper surface (i.e., a distal end surface) of the knob 16 is inclined so as to slope in a downward direction (i.e., towards the base end side of the supporting column 14) the closer it is to the outer side in the radial direction of the knob 16 (i.e., the radial direction of the supporting column 14). In addition, an angled surface 16A of the knob 16 between an upper side and an outer side in the radial direction of the knob 16 is further inclined so as to slope in a downward direction as the angled surface 16A approaches the outer side in the radial direction of the knob 16.

The knob 16 is able to be displaced (i.e., slid) within a predetermined range in an up-down direction (i.e., in an axial direction of the supporting column 14) along a central axis thereof, and is also able to be rotated within a predetermined range in one direction A and in another direction B (i.e., in a circumferential direction around the supporting column 14; see FIG. 1 and the like) around the central axis thereof. The knob 16 is exposed to the vehicle cabin interior of the vehicle, and a vehicle occupant (particularly the driver) is able to operate the knob 16. For example, a vehicle occupant is able to grip an outer circumferential surface of the knob 16 from the upper side thereof (or from the outer side in the radial direction) and then displace and rotate the knob 16, and is also able to displace the knob in a downward direction by pressing on the upper surface of the knob 16 using their fingers.

Figure 2:
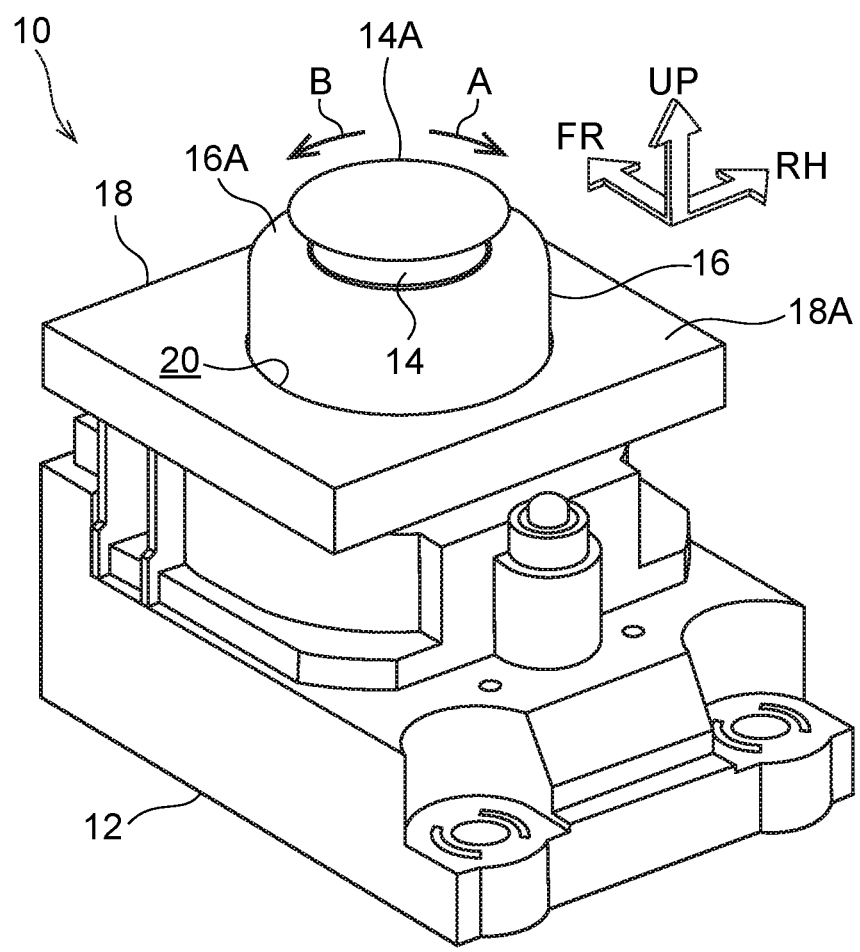
FIG. 2 is a perspective view as seen from a left-side diagonally rearward direction showing a state in which a knob has been placed in an 'N' position in the shift device according to the exemplary embodiment of the present disclosure.

The knob 16 is placed in an 'H' position (i.e., a Home position), which serves as a shift position (i.e., an initial position), as a result of an upper end thereof (i.e., an end on the upper side and the outer side in the radial direction thereof) being abutted against the lower surface of the panel 14A of the supporting column 14, and the knob 16 is placed in an 'N' position (i.e., a Neutral position), which serves as a shift position, by being displaced downwards from the 'H' position (see FIG. 2). In addition, the knob 16 is placed in an 'R' position (i.e., a Reverse position), which serves as a shift position, by being rotated in the other direction B from the 'N' position, and is placed in a 'D' position (i.e., a Drive position), which serves as a shift position, by being rotated in the one direction A from the 'N' position.

When the knob 16 is placed in a range from the 'H' position to immediately in front of the 'N' position, rotation of the knob 16 in the one direction A and the other direction B is restricted. When the knob 16 is placed in a range from the 'R' position to immediately in front of the 'N' position, and in the range from the 'D' position to immediately in front of the 'N' position, displacement of the knob 16 in the up-down direction is restricted. The knob 16 is urged from the 'N' position to the 'H' position side, and is also urged from the 'R' position and the 'D' position to the 'N' position side. In a state in which the knob 16 has been operated to a position other than the 'H' position, then once the action of the operating force on the knob 16 is released, the knob 16 is restored (i.e., is rotated and displaced) to the 'H' position by this urging force.

A substantially rectangular parallelepiped-box shaped cover 18, which serves as a covering body, is provided on the upper side of the shift device 10, and the interior of the cover 18 is open on the lower side thereof. An upper surface 18A, which serves as an exposed surface, of the cover 18 is exposed to the upper side of the console (i.e., to the vehicle cabin interior), and the cover 18 covers the upper side of the plate 12. A circular exposure hole 20 is formed so as to penetrate an upper wall of the cover 18, and the supporting column 14 of the plate 12 is inserted through this exposure hole 20 so as to be coaxial therewith. The knob 16 is disposed on the upper side of the exposure hole 20 so as to be coaxial therewith. A diameter of the exposure hole 20 is formed slightly larger than the diameter of the knob 16, and a lower surface (i.e., a base end surface) of the knob 16 is disposed at the same position in the up-down direction as the upper surface 18A of the cover 18.

Next, actions of the present exemplary embodiment will be described.

In the shift device 10 having the above-described structure, the knob 16 is disposed in the 'H' position, and the shift position of the knob 16 is altered as a result of the knob 16 being displaced in the vertical direction and being rotated in the one direction A or in the other direction B.

Here, the knob 16 is disposed on the outer side in the radial direction of the supporting column 14 of the plate 12. Because of this, unlike a case in which the supporting column 14 is displaced in a vertical direction integrally with the knob 16, when, for example, an object or the palm of the hand of a vehicle occupant is placed on the upper side of the supporting column 14 or the knob 16, the knob 16 can be inhibited from being unnecessarily displaced downwards by the supporting column 14. As a result, the knob 16 can be inhibited from being unnecessarily disposed in the 'N' position from the 'H' position, and it is possible to establish a shift position (this is the 'N' position in the present exemplary embodiment) at a displacement position downwards from the 'H' position of the knob 16, so that the degree of freedom in the shift position establishment pattern for the knob 16 (i.e., the operational pattern of the knob 16) can be improved.

Moreover, the upper end of the knob 16 abuts against the lower surface of the panel 14A of the supporting column 14, and the upper surface of the knob 16 is disposed on the lower side relative to the upper surface of the panel 14A. Because of this, unlike a case in which the upper surface of the knob 16 is disposed on the upper side relative to the upper surface of the panel 14A, when, for example, an object or the palm of the hand of a vehicle occupant is placed on the upper side of the supporting column 14 and the knob 16 (particularly when a pendent portion of a pliable object or the fleshy portion around the periphery of the palm of the hand of a vehicle occupant is placed on the upper side of the knob 16), the knob 16 can be inhibited from being unnecessarily displaced downwards.

Furthermore, the upper surface of the knob 16 is inclined so as to slope in a downwards direction the closer it is to the outer side in the radial direction of the knob 16. Because of this, when, for example, an object or the palm of the hand of a vehicle occupant is placed on the upper side of the supporting column 14 and the knob 16 (particularly when a pendent portion of a pliable object or the fleshy portion around the periphery of the palm of the hand of a vehicle occupant is placed on the upper side of the knob 16), the knob 16 can be more thoroughly inhibited from being unnecessarily displaced downwards.

Moreover, the angled surface 16A of the knob 16 between the upper side and the outer side in the radial direction of the knob 16 is curved, and is inclined so as to slope in a downward direction as the angled surface 16A approached the outer side in the radial direction of the knob 16. Because of this, when, for example, an object or the palm of the hand of a vehicle occupant is placed on the upper side of the supporting column 14 and the knob 16 (particularly when a pendent portion of a pliable object or the fleshy portion around the periphery of the palm of the hand of a vehicle occupant is placed on the upper side of the knob 16), the knob 16 can be more thoroughly inhibited from being unnecessarily displaced downwards.

Moreover, when the knob 16 is placed in the range from the 'H' position to immediately in front of the 'N' position, rotation of the knob 16 in the one direction A and the other direction B is restricted, and the knob 16 is only able to be rotated in the one direction A or the other direction B after the knob 16 has been displaced from the 'H' position to the 'N' position. Because of this, it is possible to restrict the knob 16 from being rotated in the one direction A or the other direction B before the knob 16 has been displaced from the 'H' position to the 'N' position, so that an erroneous operation of the knob 16 can be inhibited.

Furthermore, the lower surface of the knob 16 is disposed at the same position in the up-down direction as the upper surface 18A of the cover 18. Because of this, it is possible to inhibit foreign matter from penetrating between the knob 16 and the upper surface 18A of the cover 18 (i.e., the circumferential surface of the exposure hole 20), and it is also possible to inhibit the interior of the cover 18 from being visible via the exposure hole 20.

Note that, in the present exemplary embodiment, it is also possible for a rear portion (i.e., a vehicle rear-side portion) of the upper surface of the knob 16 to be disposed on the lower side of portions of the knob 16 other than the rear portion of the upper surface thereof. By employing this structure, when, for example, a vehicle occupant places the palm of their hand on the upper side of the supporting column 14 and the knob 16, it is possible to inhibit the rear portion of the upper surface of the knob 16 from being pressed by the most fleshy portion of the palm of that hand (i.e., the portion on the wrist side thereof), and the knob 16 can be more thoroughly inhibited from being unnecessarily displaced downwards.

Moreover, in the present exemplary embodiment, the upper surface of the knob 16 is disposed on the lower side relative to the upper surface of the panel 14A. However, it is also possible for the upper surface (i.e., the upper end) of the knob 16 to be disposed at the same position in the up-down direction as the upper surface of the panel 14A.

Furthermore, in the present exemplary embodiment, the lower surface of the knob 16 is disposed at the same position in the up-down direction as the upper surface 18A of the cover 18. However, it is also possible for the lower surface (i.e., the lower end) of the knob 16 to be disposed on the lower side relative to the upper surface 18A.

In addition, in the present exemplary embodiment, the knob 16 is placed in the 'N' position by being displaced downwards from the 'H' position. However, it is also possible for the knob 16 to not be placed in any shift position as a result of being displaced downwards from the 'H' position. In other words, it is also possible for the knob 16 to be placed in the 'R' position by being rotated in the other direction B from a downward displacement position from the 'H' position, and to be placed in the 'D' position by being rotated in the one direction A from the downward displacement position from the 'H' position. In this case, it is possible to provide an 'N' position switch (i.e., a neutral position switch) that can be operated by a user separately from the knob 16.

Furthermore, in the present exemplary embodiment, the shift device 10 is installed in a console. However, it is also possible for the shift device 10 to be installed another portion of the vehicle (such as the instrument panel or the steering column cover or the like). In this case, the rear portion of the upper surface of the knob 16 of the present exemplary embodiment may be used to form the lower-side portion of the upper surface of the knob 16.

Moreover, in the present exemplary embodiment, the knob 16 is displaced downwards from the 'H' position. However, it is also possible for the knob 16 to be displaced upwards from the 'H' position.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A shift device comprising:
   a protruding portion that protrudes towards a vehicle cabin side, a protruding direction of the protruding portion being a distal direction, a direction opposite from the protruding direction being a base direction, and a radial direction outer side of the protruding portion being an outer side; and
   a shift body disposed at the outer side of the protruding portion, and having a shift position that is altered as a result of the shift body being rotated towards a circumferential direction side of the protruding portion and also being displaced along an axial direction of the protruding portion,
   wherein a portion of the protruding portion in the distal direction from the shift body protrudes toward the outer side such that the portion partly covers the shift body in the distal direction of the shift body.

2. The shift device according to claim 1, wherein a surface in the distal direction of the shift body is disposed either at a same position in the axial direction of the protruding portion as a distal end surface of the protruding portion, or in the base direction relative to the distal end surface of the protruding portion.

3. The shift device according to claim 1, wherein an angled surface of the shift body between the distal direction of the shift body and the outer side of the shift body is inclined so as to slope towards the base direction as the angled surface approaches the outer side.

4. The shift device according to claim 1, wherein a vehicle rearward side portion of a surface in the distal direction of the shift body is disposed in the base direction.

5. The shift device according to claim 1, further comprising an exposed surface that is exposed towards the vehicle cabin side, wherein a surface in the base direction of the shift body is disposed either at a same position in the axial direction of the protruding portion as the exposed surface, or in the base direction relative to the exposed surface.

6. The shift device according to claim 1, wherein the shift body is configured to be rotatable after having been displaced.

7. The shift device according to claim 1, wherein a distal end of the protruding portion protrudes towards the outer side.

8. The shift device according to claim 1, wherein a surface in the distal direction of the shift body is inclined so as to slope towards the base direction as the surface approaches the outer side.

9. The shift device according to claim 1, wherein the shift position is located at a displacement position of the shift body.

10. The shift device according to claim 1, wherein the protruding portion is fixed to a supporting body.

11. The shift device according to claim 1, wherein the shift body is separated from the portion of the protruding portion which is disposed in the distal direction of the shift body when the shift body is displaced towards the base direction.

12. The shift device according to claim 1, wherein the portion of the protruding portion overlaps the shift body in the distal direction of the shift body.

13. The shift device according to claim 1, wherein a cover and the protruding portion are fixed to a vehicle side, an exposure hole is provided at the cover and is disposed coaxially with the shift body, and a surface in the base direction of the shift body is always disposed in the base direction relative to a surface in the distal direction of the cover.

* * * * *